Dec. 13, 1938.   A. K. FROLICH ET AL   2,140,471

PROCESS AND APPARATUS FOR MANUFACTURING CEMENT

Filed Aug. 14, 1937

INVENTORS
Andrew K. Frolich
Andrew Lundteigen Jr.
BY
Thos. E. Scofield
ATTORNEY

Patented Dec. 13, 1938

2,140,471

UNITED STATES PATENT OFFICE 2,140,471

PROCESS AND APPARATUS FOR MANUFACTURING CEMENT

Andrew K. Frolich and Andrew Lundteigen, Jr., Louisville, Nebr., assignors to Ash Grove Lime & Portland Cement Co., Kansas City, Mo., a corporation of Maine Application August 14, 1937, Serial No. 159,186

6 Claims. (Cl. 263—53)

Our invention relates to a process and apparatus for manufacturing cement, and more particularly to a method of manufacturing cement by the wet process in which dust is collected from the flue gases of the kilns and recycled thereto for use in manufacturing Portland cement, and to a novel apparatus for carrying out the process.

In the wet process of manufacturing cement, the raw materials, usually limestone and shale, are quarried, crushed, and stored without drying. They are then mixed in proper proportions and fed to grinding machinery, at which point water is added and the materials ground wet. The result is a thin mud or "slurry," which is made just fluid enough to flow readily, and usually contains from 30 to 40 per cent of water. The slurry is usually fed directly to the kilns and burned. The kilns are generally of the rotary type, comprising a cylinder from 6 to 12 feet in diameter and from 60 to 400 feet in length, which is made of sheet steel and lined with fire brick. The cylinder is usually supported at a very slight pitch and is rotated on heavy friction rollers. The upper end of the kiln projects into a connecting brick flue which is surmounted by a steel or concrete stack, generally lined with fire brick. Ordinarily, the material to be burned is fed into the kiln through an inclined steel pipe or through a water-jacketed screw conveyor in a constant stream. The lower end of the kiln is closed by a fire-brick hood in which fuel-burning apparatus is provided. The hot gases pass through the kiln, furnishing the necessary temperature which, at the hottest part, is about 1500° C. The gases leave the kiln at a temperature of 200° to 500° C. The raw material, as it enters the kiln, is at first merely heated up and the water is driven off. The carbon dioxide is then driven off and the material sticks together, forming small, soft, lemon-yellow balls, which, when they reach the hottest part of the kiln (usually the last 30 feet), partially vitrefy, become rough and hard, and burn to a greenish-black color.

The clinker is then cooled and, after cooling, is ground in any suitable mill, usually to such a fineness that at least 78 per cent will pass through a sieve having 200 meshes to the linear inch.

Normally, from 5 to 8 per cent of the raw material is carried away with the exhaust gases of the kiln as dust. If the kiln is forced, this percentage may be greater, being as high as 10 per cent. In many localities, the flue dust settles on vegetation, buildings, and homes, with the result that legislation has been enacted, requiring the removal of the flue dust from the flue gases. Various schemes have been used to eliminate the dust. Settling chambers, water sprays, and electrical precipitation by means of an electrostatic field, have been used.

The flue dust contains about the same proportions of limestone, clay, and shale as does the original raw materials from which the cement clinker is formed. Attempts to utilize the flue dust by mixing it in a slurry with the freshly-ground raw materials have resulted in failure, occasioned by the fact that, when flue dust is mixed with a normal slurry, the slurry is rapidly thickened to such an extent that normal feeding methods are impossible of employment, unless prohibitive amounts of water are added. Attempts have been made to separately form slurries of flue dust and of freshly-ground raw materials, and then mix the two slurries for introduction into the kiln. Even under these conditions, it has been found that the mixed slurry will thicken rapidly and fail to flow, thus rendering the normal feeding apparatus inoperative unless prohibitive amounts of additional water are used.

One object of our invention is to provide a method and apparatus for introducing flue-dust slurry into the kiln along with normal slurry, in a manner which prevents mixing of the two slurries until after they enter the kiln.

Another object of our invention is to provide a method and apparatus for utilizing the raw materials represented by flue dust in the manufacture of Portland cement, along with the freshly-ground raw materials.

Other and further objects of our invention will appear from the following description:

In the accompanying drawing, which forms part of the instant specification and is to be read in conjunction therewith, reference numerals are used to indicate like parts in the various views.

Figure 1:
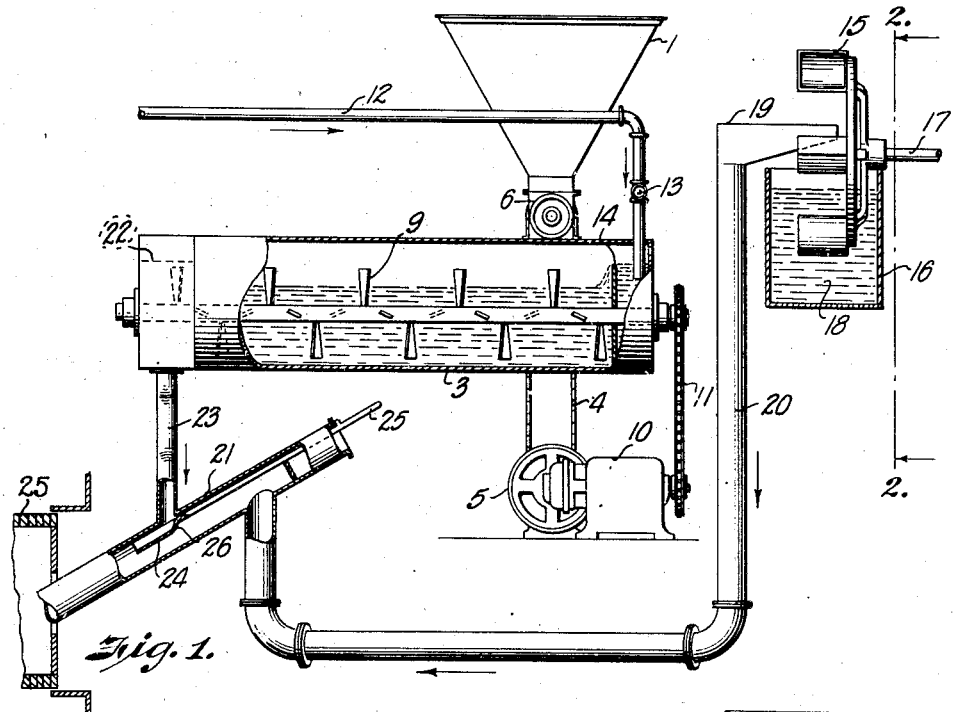
Figure 1 is a diagrammatic view of one form of apparatus embodying our invention and capable of carrying out the method of our invention, with parts of the apparatus in section.
Figure 2:
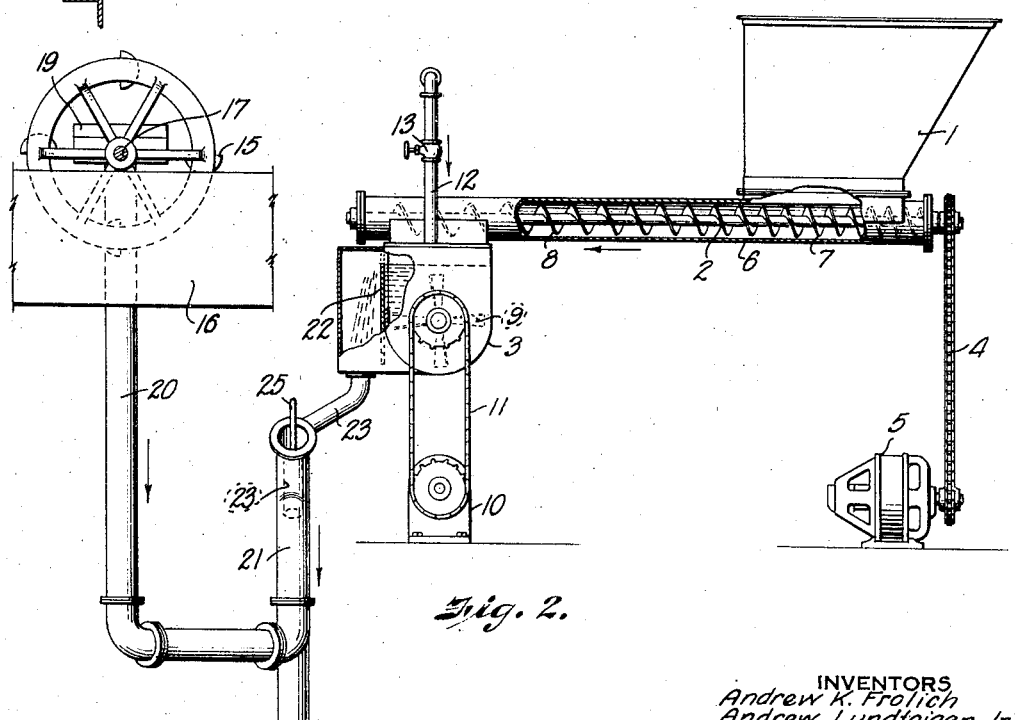
Figure 2 is a view taken along the line 2—2 in Figure 1, with parts in section.

Referring now to the drawing: Flue dust, which has been collected in a precipitating chamber by electrical precipitation or in any other appropriate manner, is placed in a feed bin 1, from which it is fed by a screw conveyor 2 to a mixing trough 3. The screw conveyor 2 is driven by any suitable means, as, for example, an electric motor 5 having a chain drive 4. The feed screw rotates in a housing 6, and has the flights 7 of the screw adjacent to the feed bin 1 of relatively small pitch and spaced rather closely. The flights 8 of the feed screw adjacent to the mixing trough 3 are of greater pitch and spaced farther apart than the flights 7. The change of pitch in the conveyor pipes prevents choking of the feed screw and aids in maintaining uniformity of feed. The close pitch adjacent to the feed bin 1 prevents flooding the flue dust through the screw.

The flue dust is discharged by the screw conveyor 2 into the mixing trough 3, which is provided with an appropriate agitator 9 driven by any suitable means, as, for example, an electric motor 10 through a driving chain 11. Water is introduced into the mixing trough 3 through water line 12, which is controlled by a valve 13, the water discharging into a weir-box formed by a weir 14. In forming the normal slurry, about 35 per cent of water is used. In making the flue-dust slurry, more water must be employed to obtain a slurry having the same consistency or viscosity. The electric motor 5 is a variable speed motor, and it is so controlled, in relation to the control of the water by valve 13, that a slurry of the desired consistency is formed. The normal slurry of freshly-ground materials is supplied to a suitable feeding mechanism, such as a bucket wheel 15, through a trough 16. The bucket wheel 15 is rotated by driving shaft 17, and adapted to transfer slurry 18 from the trough 16 into a slurry-feeding hopper 19, whence the normal slurry flows through slurry pipe 20, which communicates with an inclined main slurry feed pipe 21, which ultimately introduces the slurry into the kiln 25.

The flue-dust slurry leaves the mixing trough 3 over an adjustable weir 22, and flows through flue-dust slurry feed pipe 23 into main slurry feed pipe 21.

The main slurry feed pipe 21 is inclined, to carry off the slurry at a suitable velocity, and is of such diameter that the normal rate of feed of the slurry will fill the bottom of the pipe to about one-fourth to one-third of its diameter. At the point at which the flue-dust slurry feed pipe 23 enters the main slurry feed pipe 21, we position a deflecting spoon 24. The deflecting spoon 24 is held in place by means of a handle 25 through the upper end of the main slurry feed pipe 21, though it is to be understood that it may be positioned in any suitable manner. The deflecting spoon 24 is formed with a rounded portion 26 which may, if desired, be of streamline form. The deflecting spoon 24 is positioned so that its lower portion is slightly submerged in the main stream of slurry which has been introduced into the main slurry feed pipe 21 through slurry pipe 20. In this position, the deflecting spoon 24 will channel the main stream of slurry and permit the flue-dust slurry which is being continuously deposited upon the inner surface of the deflecting spoon 24 from flue-dust slurry feed pipe 23 to flow along with the main stream of slurry in the channel which has been prepared for it by the deflecting spoon 24. It is to be understood, of course, that the deflecting spoon 24 may be at, or slightly above, the surface of the main stream of slurry, as the object of this method and means of introducing the flue-dust slurry is to prevent a mixing of the two slurries. From a point below the deflecting spoon 24, a double layer of slurry will flow into the kiln 25. The time elapsing is so short with practically no agitation taking place, that the two slurries will flow into the kilns substantially unmixed. In the rotary kiln 25 which is provided with the usual mixing and agitating devices, such as chains, shelves, or the like, the two slurries will be thoroughly mixed to form a homogeneous slurry which is converted into Portland cement clinker in the usual manner known to the art.

It will be observed that the object of our method and apparatus is to introduce the two slurries into the kiln substantially simultaneously in unmixed condition. Mixture prior to entry into the kiln results in the thickening of the slurry and the choking of the slurry-feeding duct. Introduction at separated points results in segregation of the flue-dust material from the freshly-ground material. In order to make the best cement, the two slurries should be homogeneously mixed. Our method can be carried out by introducing the slurries to the kiln through separate ducts, merging at a substantially common point in the kiln. By means of our apparatus we can employ a common slurry-feeding duct, insuring the simultaneous introduction of the two slurries into the kiln at a common point. The temperature within the kiln is so high that dehydration begins immediately the slurry enters the kiln, so that it is important for uniformity that the slurries be introduced substantially simultaneously at a substantially common point.

It will be observed that we have accomplished the objects of our invention. We have provided a method of utilizing flue dust from wet processes in the manufacture of Portland cement which, so far as we know, has not heretofore been successfully accomplished. By means of our method, we are enabled to make a considerable saving of raw material, reducing digging, handling, and grinding costs. Our flue-dust feed screw prevents the flooding of the conveyor with the fine flue dust, and permits accurate control of the feed of flue dust into the mixing trough to be achieved. The amount of material in the mixing trough is readily governed by the adjustable discharge overflow weir.

It will be understood that certain features and subcombinations are of utility and may be employed without reference to other features and subcombinations. This is contemplated by, and is within, the scope of our claims. It is obvious, further, that various changes may be made in details within the scope of our claims without departing from the spirit of our invention. It is, therefore, to be understood that our invention is not to be limited to the specific details shown and described.

Having thus described our invention, what we claim is:

1. In a method of manufacturing Portland cement by the wet process in which a slurry of freshly-ground raw materials is prepared and fed into a kiln, the steps of collection of raw materials in the form of flue dust from the flue gases of the kiln, forming a slurry with said flue dust and introducing said flue-dust slurry into said kiln simultaneously with said fresh slurry without substantial admixture therewith.

2. In a method of manufacturing Portland cement by the wet process in which a slurry of freshly-ground raw materials is prepared and fed into a kiln, the steps of collection of raw materials in the form of flue dust from the flue gases of the kiln, forming a slurry with said flue dust and introducing said flue-dust slurry into said kiln simultaneously with said fresh slurry and separately therefrom.

3. In a method of manufacturing Portland cement by the wet process in which a slurry of freshly-ground raw materials is prepared and fed into a kiln in an elongated, confined stream, the steps of collection of raw materials in the form of flue dust from the flue gases of the kiln, forming a slurry with said flue dust and introducing said flue-dust slurry into said elongated, confined stream of fresh slurry while preventing extensive admixture of said slurries, and flowing said combined stream of fresh slurry and flue-dust slurry in separate contiguous layers into said kiln.

4. In an apparatus for the manufacture of Portland cement: means for feeding a slurry of freshly-ground materials into a cement kiln; means for forming a slurry of flue dust recovered from the kiln flue gases; and means for introducing said flue-dust slurry into the stream of fresh slurry without substantial agitation.

5. An apparatus as in claim 4, in which said means for feeding fresh slurry to the kiln comprises an inclined pipe and said means for feeding flue-dust slurry comprises a second pipe communicating with said first pipe and a deflecting member positioned adjacent to the point of communication.

6. An apparatus as in claim 4, in which said means for forming a slurry of flue dust comprises a flue-dust container, a mixing trough, a conveyor screw for conveying flue dust from said flue-dust container to said mixing trough, said conveyor screw being formed with flights of different pitch, the flights adjacent to the flue-dust container being of smaller pitch than those adjacent to the mixing trough, means for rotating said conveying screw, means for introducing water into said mixing trough, an agitator in said mixing trough, and means for actuating said agitator.

ANDREW K. FROLICH.
ANDREW LUNDTEIGEN, Jr.